United States Patent
Langford et al.

(10) Patent No.: US 8,598,761 B2
(45) Date of Patent: Dec. 3, 2013

(54) ROTOR MAGNET POSITIONING DEVICE

(75) Inventors: Charles Richard Langford, Grays Point (AU); Steven Peter Camilleri, Darwin (AU); Dean James Patterson, Murwillumbah (AU)

(73) Assignee: In Motion Technologies Pty., Ltd., Dandensong South, Victoria (AU)

( * ) Notice: Subject to any disclaimer, the term of this patent is extended or adjusted under 35 U.S.C. 154(b) by 407 days.

(21) Appl. No.: 12/598,652

(22) PCT Filed: Apr. 29, 2008

(86) PCT No.: PCT/AU2008/000591
§ 371 (c)(1),
(2), (4) Date: Mar. 1, 2010

(87) PCT Pub. No.: WO2008/134796
PCT Pub. Date: Nov. 13, 2008

(65) Prior Publication Data
US 2010/0164316 A1 Jul. 1, 2010

(30) Foreign Application Priority Data

May 3, 2007 (AU) ................................ 2007902348

(51) Int. Cl.
*H02K 21/12* (2006.01)
(52) U.S. Cl.
USPC .................. 310/156.29; 310/156.28; 310/268
(58) Field of Classification Search
USPC ................................ 310/156.29, 156.28, 268
See application file for complete search history.

(56) References Cited

U.S. PATENT DOCUMENTS

| | | | | |
|---|---|---|---|---|
| 3,121,814 A | * | 2/1964 | Kober | 310/156.32 |
| 3,678,314 A | * | 7/1972 | Carter | 310/268 |
| 4,060,745 A | * | 11/1977 | Linscott, Jr. | 310/156.22 |
| 4,259,603 A | * | 3/1981 | Uchiyama et al. | 310/68 B |
| 4,656,379 A | * | 4/1987 | McCarty | 310/181 |
| 4,877,986 A | * | 10/1989 | Shimizu | 310/153 |
| 5,608,281 A | * | 3/1997 | Gerling et al. | 310/268 |
| 5,691,589 A | * | 11/1997 | Keim et al. | 310/156.29 |
| 5,831,365 A | * | 11/1998 | Keim et al. | 310/156.29 |
| 5,952,742 A | * | 9/1999 | Stoiber et al. | 310/12.18 |

(Continued)

FOREIGN PATENT DOCUMENTS

EP 0052878 B1 8/1985

OTHER PUBLICATIONS

International Preliminary Report on Patentability and Written Opinion of PCT/AU2008/000591 dated Jul. 10, 2009.

*Primary Examiner* — Tran Nguyen
*Assistant Examiner* — Alex W Mok
(74) *Attorney, Agent, or Firm* — Armstrong Teasdale LLP (57) ABSTRACT

A device for positioning a planar array of magnets within a permanent magnet electrical machine of the type having a rotor and stator with an air gap there between. The device includes a body made of non-ferrous material and having a first side which is attachable to the rotor and a second side which, in an assembled machine, faces the air gap. The first side of the body has a plurality of recesses therein for receiving a corresponding plurality of magnets. The recesses are shaped and arranged to separate the magnets from each other and maintain a consistent spacing between them. When the device is attached to the rotor the magnets are held in a fixed position against the rotor. The electrical machine may be a motor or a generator.

13 Claims, 10 Drawing Sheets

(56) References Cited

U.S. PATENT DOCUMENTS

| | | | |
|---|---|---|---|
| 6,078,121 A * | 6/2000 | Poag et al. | 310/91 |
| 6,232,690 B1 * | 5/2001 | Schmider | 310/156.37 |
| 6,373,162 B1 * | 4/2002 | Liang et al. | 310/156.53 |
| 6,605,883 B2 * | 8/2003 | Isozaki et al. | 310/49.42 |
| 7,081,696 B2 * | 7/2006 | Ritchey | 310/114 |
| 7,187,098 B2 * | 3/2007 | Hasebe et al. | 310/156.43 |
| 2002/0175582 A1 * | 11/2002 | Lopatinsky et al. | 310/156.01 |
| 2003/0107291 A1 * | 6/2003 | Takahata et al. | 310/216 |
| 2005/0194855 A1 * | 9/2005 | Hasebe et al. | 310/156.43 |
| 2005/0210663 A1 | 9/2005 | Ishida et al. | |
| 2005/0246886 A1 * | 11/2005 | Morel | 29/596 |
| 2006/0063403 A1 | 3/2006 | Kataoka et al. | |
| 2006/0113855 A1 * | 6/2006 | Tsai et al. | 310/156.32 |
| 2006/0138890 A1 * | 6/2006 | Kato | 310/156.35 |
| 2006/0284507 A1 * | 12/2006 | Murakami | 310/156.37 |
| 2007/0013251 A1 * | 1/2007 | Djuric | 310/113 |
| 2007/0029889 A1 * | 2/2007 | Dunn et al. | 310/156.43 |
| 2007/0040465 A1 * | 2/2007 | Al-khayat | 310/179 |
| 2007/0046124 A1 * | 3/2007 | Aydin et al. | 310/156.37 |
| 2007/0096571 A1 * | 5/2007 | Yuratich | 310/87 |
| 2008/0042515 A1 * | 2/2008 | Butterfield | 310/268 |
| 2008/0088200 A1 * | 4/2008 | Ritchey | 310/268 |

* cited by examiner

ROTOR MAGNET POSITIONING DEVICE

CROSS-REFERENCE TO RELATED APPLICATIONS

This application is a 35 U.S.C. §371 National Stage Application of PCT/AU2008/000591, filed Apr. 29, 2008, which claims priority to Australian Patent Application No. 2007902348, filed May 3, 2007, the entire content of each application is incorporated herein by reference.

FIELD OF THE INVENTION

The present invention relates generally to permanent magnet electrical machines including a planar array of magnets. In particular, the invention relates to a device for positioning magnets on a rotor of a permanent magnet electrical machine. The device is especially suited for use in axial flux electric motors and it will be convenient to describe the invention in relation to that example application. It should be understood however that the device is also suitable for other forms of electrical machine that incorporate a planar array of magnets, such as linear motors or generators.

BACKGROUND OF THE INVENTION

In a permanent magnet electric machine the magnets are often secured to the rotor in a planar array by an adhesive. Positioning of the magnets on the rotor is a difficult and time consuming exercise because the magnets tend to be attracted to each other or repel each other, depending upon the orientation of the magnets. It is therefore important that the magnets be precisely placed in a position in which the magnetic forces are balanced. For example, the magnets may be oriented at an equal distance from one another in an alternating pole configuration, i.e. North, South, North, South etc. This arrangement would produce an attractive force between the magnets, which results in a net force of zero on each magnet if the equal distance between magnets is carefully maintained in a precarious equilibrium.

Given this issue, it is also important that the magnets be held in that position at least until the adhesive has properly cured. The curing time of the adhesive thus makes handling of partially assembled rotors a delicate exercise because any movement of the magnets outside of their ideal positions will cause them to move further, until they eventually come together. It is therefore undesirable to handle partially assembled rotors before the adhesive is completely cured. This slows down the production process and/or requires a large amount of valuable work space to be dedicated to the storage of rotors whilst the adhesive cures.

In a rotating motor having magnets attached to a rotor, centrifugal forces on the magnets during operation of the motor tend to pull the magnets radially outward and away from the rotor. If the sole means by which the magnets are secured to the rotor is an adhesive, the speed of the motor is thus limited by the strength of the adhesive. In this type of construction it is thus essential that the operating speed of the motor be kept well below a speed at which the centrifugal forces generated upon the magnets would overcome the adhesive bond holding the magnets to the rotor. Failure of the adhesive bonds could cause the magnets to be dislodged and subsequently damage the motor.

Magnets used in electric motors may be coated or plated to prevent corrosion. Thus, any adhesive which is used to secure a magnet to a rotor is in fact merely securing the anticorrosion coating or plating to the rotor. The strength of the bond between the actual magnet and the rotor is thus limited to the strength of the bond between the anticorrosion coating/plating and the magnet material. The use of adhesive alone is therefore not ideal for securing magnets to a rotor but it is still the norm.

With the foregoing difficulties in assembly and operation of permanent magnet electrical machines in mind, there is a need for a device which could facilitate the positioning of magnets within a permanent magnet electrical machine, such as a motor. It would also be desirable, although not essential, for the device to be able to remain within the assembled machine to assist in retaining the magnets to the rotor in their correct positions, with or without the use of adhesive, during operation of the motor.

SUMMARY OF THE INVENTION

One aspect of the present invention accordingly provides a device for positioning magnets in a planar array within a permanent magnet electrical machine of the type having a rotor and stator with an air gap there between. The device includes a body made of non-ferrous material and has a first side which is attachable to the rotor and a second side which, in an assembled machine, faces the air gap. The first side of the body has a plurality of recesses therein for receiving a corresponding plurality of magnets. The recesses are shaped and arranged to separate the magnets from each other and maintain a consistent spacing between them. When the device is attached to the rotor the magnets are held in a fixed position against the rotor.

The electrical machine may be a motor or a generator. The invention is applicable to both types of machine. Suitable motors may include rotary motors, in which a rotor rotates about an axis, or linear motors, in which a "rotor" moves linearly with respect to an elongate stationary stator. The term "rotor" is thus used more broadly in connection with this type of motor because the rotor does not actually rotate. Rotary motors may include axial flux motors, in which the flux in the air gap extends in a direction parallel to the axis of rotation. It is suggested that the more common radial flux machine in which the flux extends radially from the axis of rotation does not benefit as highly from the invention. In that case the magnets are not configured in a planar array but are configured in a circular array. This means that a part produced according to the invention would need to mate to a circular rotor and project a circular face into the air gap, which leads to production tolerance issues that are difficult to overcome. In the case of a planar array of magnets the invention results in a simple, flat shape which is substantially easier to produce and use. Similarly, the invention may be applicable to all types of generator that incorporate planar arrays of magnets.

The magnet positioning device in accordance with the invention provides significant advantages over prior art methods used for securing magnets to a rotor. The device includes recesses which may be specifically shaped to closely conform to the shape the magnets. This prevents movement of the magnets within the recesses and maintains a consistent spacing between the magnets, both during assembly of the rotor and during subsequent operation of the machine.

In the latter regard, it is to be noted that if adhesive is also used to secure the magnets to the rotor, the device may be removed from the rotor after the adhesive has cured. Given that the device maintains a consistent spacing between the magnets, there is now no danger of the magnets moving if the rotor is handled before the adhesive is properly cured. The device will retain the magnets in their correct positions.

Whilst the device may be removed from the assembled rotor, it is however preferably that it remains in place after the motor is fully assembled. In this way, the device assists in securing the magnets to the rotor during subsequent operation of the machine.

In a preferred embodiment, the device is designed for use in an axial flux rotary motor having a disc shaped rotor which is rotatable about an axis. In this type of motor the rotor disc is spaced from the stator in a direction extending along the axis with an air gap then remaining between the stator and the rotor disc. In this embodiment, the body of the device may have an annular shape and the recesses for the magnets may be spaced about the annulus such that, in operation of the motor, the magnets are spaced around the axis of rotation.

Advantageously, connecting means are provided for attaching the body of the device to the rotor. In the case of an axial flux motor, the connecting means may include a plurality of clips spaced around the body of the device so as to attach the body to the rotor disc. Preferably, the clips are positioned adjacent a peripheral edge of the body and are shaped to engage a peripheral edge of the rotor disc.

Preferably, the device includes locating means for aligning the body of the device relative to the rotor. If the machine is an axial flux rotary motor, the locating means preferably includes at least one pin projecting in an axial direction from the first side of the body for engaging with a corresponding aperture in the rotor disc. This arrangement thereby facilitates alignment of the body of the device with the rotor disc. More preferably, the locating means includes at least three pins projecting in the axial direction from the first side of the body for engaging with at least three corresponding apertures in the rotor disc. In this embodiment, the pins may be configured to hold the first side of the body away from the rotor disc until the pins and corresponding apertures are aligned. This also ensures accurate concentricity of the magnet array with respect to the rotor disc.

In a preferred embodiment, the device also includes balancing means for enabling weights to be secured to the device and thereby allow any imbalance in the rotor to be corrected. In the case of a radial flux rotary motor, the balancing means may include an annular grove located around a peripheral edge of the body of the device. The groove is preferably provided with a cross sectional shape which is configured to enable weights to be inserted and retained within the annular groove.

Another aspect of the present invention provides a permanent magnet electrical machine including a rotor, a stator, a plurality of magnets and a device as described above for positioning the magnets on the rotor. In such a machine the device may also serve to assist in securing the magnets to the rotor during operation.

A further aspect of the invention provides a method of assembling a rotor for a permanent magnet electrical machine. The method includes the steps of
  providing a rotor;
  providing a magnet positioning device as described above;
  providing a plurality of magnets;
  inserting the magnets into the recesses in the first side of the body of the device;
  bringing a ferrous object into contact with the second side of the body of the device such that the ferrous object is adhered to the device by magnetic forces generated by the magnets and the magnets are held within the recesses by the magnetic forces;
  attaching the first side of the body of the device to the rotor such that the magnets are held in a fixed position against the rotor; and
  removing the ferrous object from the second side of the body.

This method facilitates the assembly of a rotor for a permanent magnet electrical machine. The ferrous object serves to hold the magnets within the recesses of the positioning device whilst that device is being aligned with, and ultimately attached to, the rotor. The ferrous object may be of any suitable form and could, for example, have an annular shape with an outer diameter similar to the outer diameter of the positioning device. Alternatively, the ferrous object may be circular with a diameter similar to that of the outer diameter of the positioning device. As a further alternative, if the assembly method is implemented by an automated machine, the ferrous object may be a component of the machine.

The magnets used in the electrical machines for which the present invention is applicable may be of any known type. There are however advantages in using high power magnets made of rare-earth metals such as neodymium. These provide a magnetic force which is much greater than conventional magnets for the same size and weight. It is for this reason that precise positioning of the magnets, especially during assembly of a rotor, becomes important. The magnets tend to stick together when being handled and may be very difficult to separate by hand.

Having said that, it is also possible to use magnets which are initially provided in an unmagnetised state and then subsequently magnetise them after they have been placed into the positioning device, or possibly after the rotor has been assembled. In this instance a slightly different assembly method may be employed to hold the magnets within the positioning device as it is brought into contact with the rotor. For example, the ferrous object used in the assembly method described above may be replaced with a vacuum holding device.

To assist the further understanding of the invention, reference is now made to the accompanying drawings which illustrate preferred embodiments. It is to be appreciated that these embodiments are given by way of illustration only and the invention is not to be limited by this illustration.

DETAILED DESCRIPTION OF PREFERRED EMBODIMENTS

Initially, it should be understood that throughout this description the terms "top" and "bottom" are used merely for convenience to refer to the embodiments shown in the accompanying drawings. It should accordingly be understood that these terms have no relevance to the orientation of the actual apparatus as it may be manufactured or used.

Figure 1:
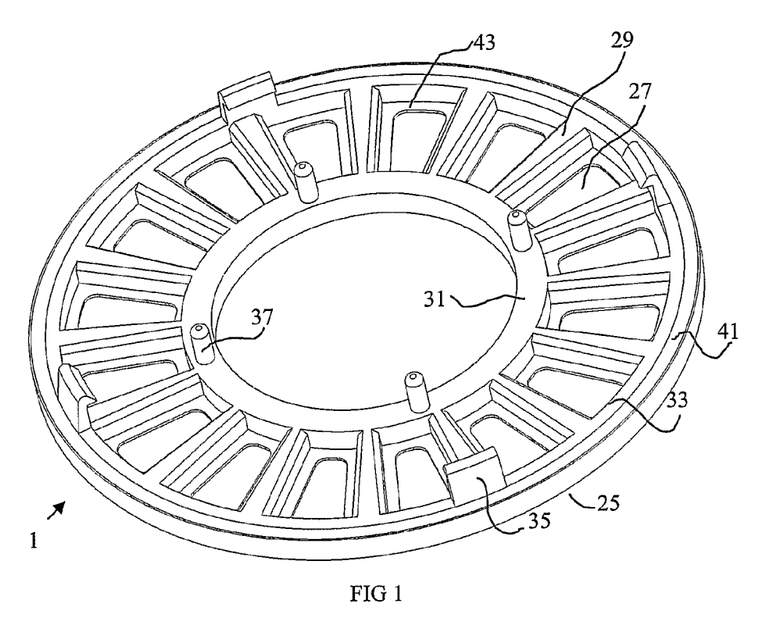
FIG. 1 shows a bottom perspective view of a magnet positioning device for an axial flux rotary motor in accordance with a preferred embodiment of the present invention.
Figure 2:
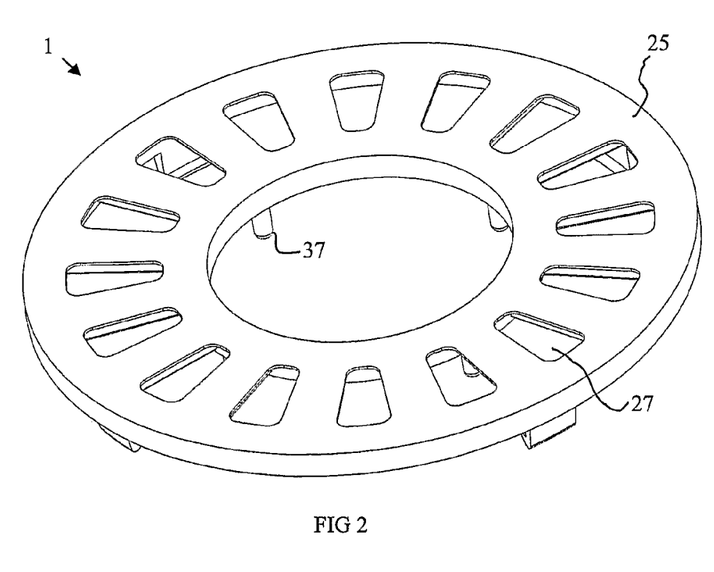
FIG. 2 shows a top perspective view of the magnet positioning device of FIG. 1.
Figure 4:
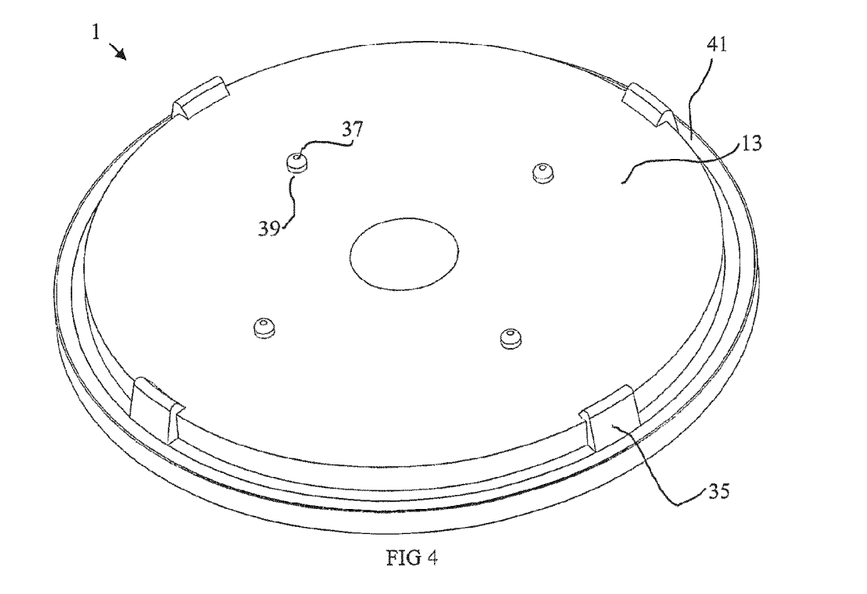
FIG. 4 shows a bottom perspective view of the magnet positioning device of FIG. 1 as attached to a rotor.
Figure 5:
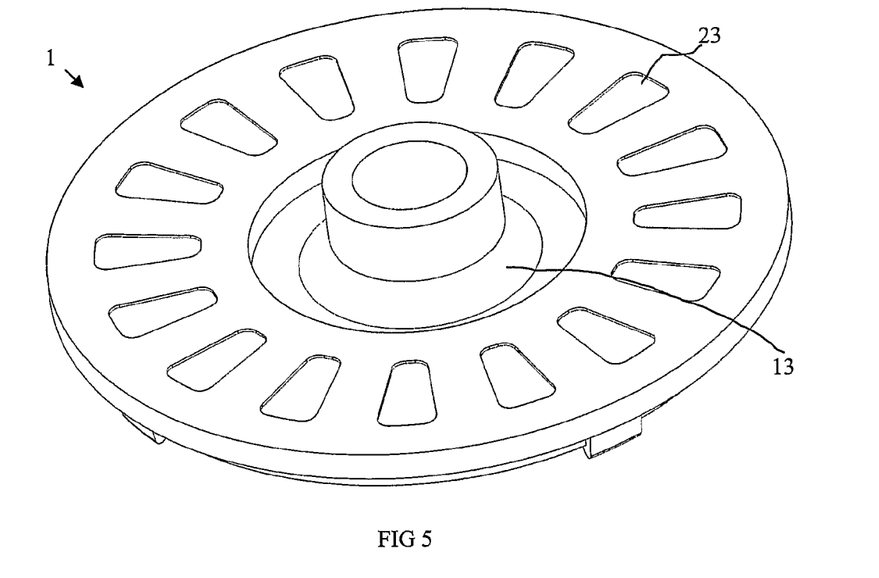
FIG. 5 shows a top perspective view of the magnet positioning device and rotor shown in FIG. 4.
Figure 6:
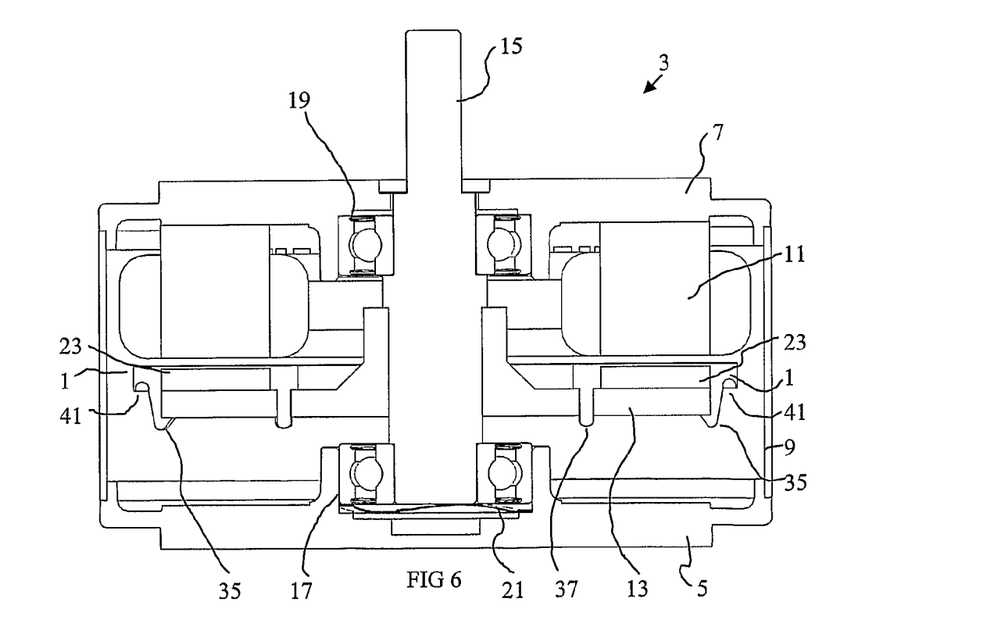
FIG. 6 shows a cross sectional side view of an axial flux rotary motor incorporating the magnet positioning device of FIG. 1.
Figure 7:
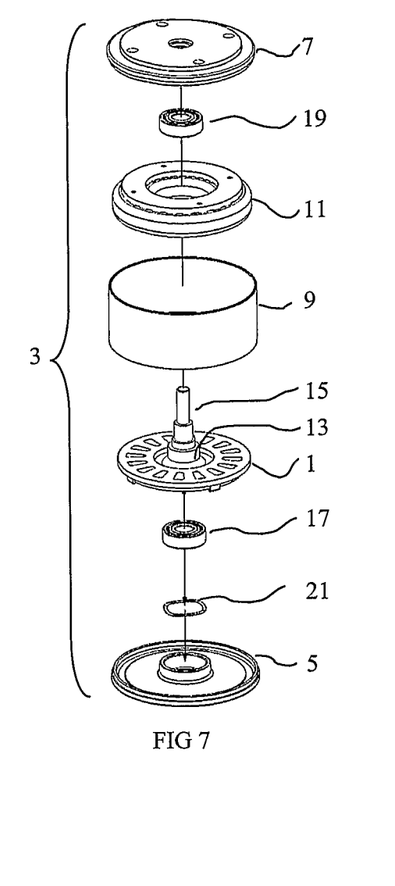
FIG. 7 shows an exploded perspective view of the motor shown in FIG. 6.

FIGS. 1 to 7 of the drawings show a preferred embodiment of the present invention. In particular, FIGS. 1 and 2 show bottom and top perspective views, respectively, of a magnet positioning device 1 for use in a permanent magnet axial flux electric motor 3, as shown in FIGS. 6 and 7.

The components of the motor can be best seen in the exploded view shown in FIG. 7. These components include a housing, incorporating end shields 5 and 7 and a side wall 9, a stator 11 (although the windings are not shown in the drawings) mounted within the housing. A rotor disc 13 is mounted on a shaft 15 which is rotatable within the housing by means of bearings 17 and 19. A wave washer 21 is also included between the bearing 17 and the end shield 5 so as to reduce noise produced by the bearing and promote quieter operation of the motor 3.

As can be seen in the cross sectional side view shown in FIG. 6, the rotor disc 13 includes a plurality of permanent magnets 23, which are preferably neodymium magnets. As can also be seen in FIG. 6, an air gap exists between the top face of the magnet positioning device 1 (attached to the rotor disc 13) and a lower face of the stator 11.

Referring again to FIGS. 1 and 2, FIG. 1 shows a first side of the body 25 of the magnet positioning device 1, which is attachable to the rotor 13. A bottom perspective view of the rotor disc 13 attached to the positioning device 1 is shown in FIG. 4 and a top perspective view is shown in FIG. 5.

FIG. 2 shows a second side of the body 25 of the magnet positioning device 1 which, in the assembled motor shown in FIG. 6, faces the air gap.

Figure 3:
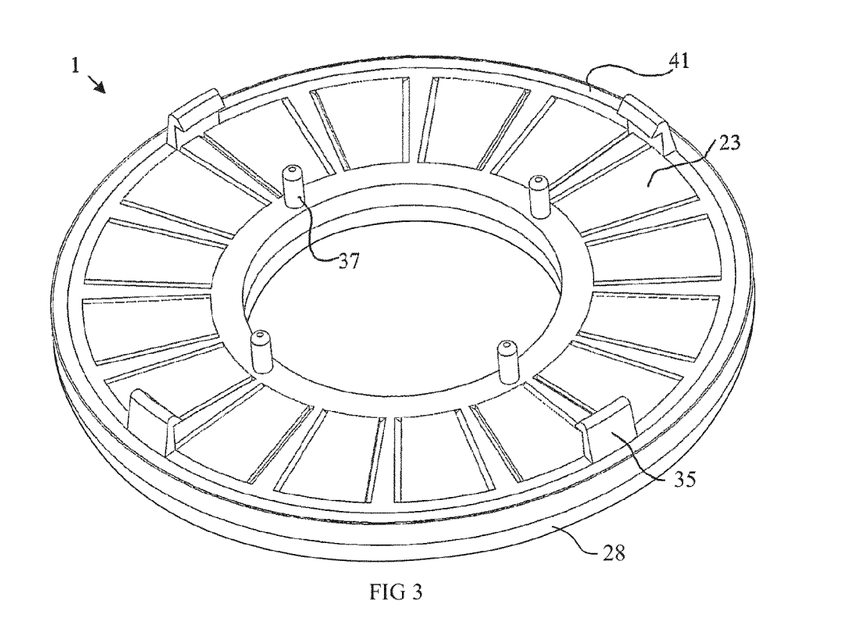
FIG. 3 shows a bottom perspective view of the magnet positioning device shown in FIG. 1 together with magnets inserted therein.

The body 25 of the magnet positioning device 1 is made of a non ferrous and non electrically conductive material, such as a plastic of a suitable type. Examples may include Nylon, which might be glass fiber filled for increased strength or mineral filled for reduced cost. The body 25 of the device 1 is of an annular shape and the first side of the annulus includes a plurality of recesses 27. These recesses 27 are shaped so as to closely conform to the shape of the magnets 23. FIG. 3 shows a bottom perspective view of the magnet positioning device 1 together with magnets 23 inserted within the recesses 27. The close conformity of the shape of the recesses 27 to the shape of the magnets 23 serves to prevent the magnets 23 moving within the recesses 27. The magnets 23 are therefore separated from each other and a uniform spacing is maintained between them so as to prevent the magnets 23 being drawn together or being repelled.

As can be best seen in FIG. 1, the recesses are formed by a plurality of ribs 29 which extend between inner and outer support rings 31 and 33 respectively. Together, these support rings 31 and 33 and separating ribs 29 form for a spider-like cage structure.

In the preferred embodiment shown in FIGS. 1 to 7, the body 25 of the magnet positioning device 1 includes connecting means for attaching the body 25 to the rotor disc 13. The connecting means is provided in the form of a plurality of clips 35 spaced around a peripheral edge of the body 25.

The body 25 of the magnet positioning device 1 also includes locating means for aligning the body relative to the rotor disc 13. In the embodiment shown, the locating means includes four pins 37 projecting in an axial direction from the first side of the body 25. These pins 37 engage with corresponding apertures 39 in the rotor disc 13 so as to facilitate alignment of the body 25 with the rotor disc 13.

The body 25 of the device 1 also includes balancing means in the form of an annular groove 41 extending around a peripheral edge of the body 25. The cross sectional shape of the groove 41 is configured to enable weights, such as metal balls or wire, to be inserted and retained within the groove 41. Any imbalance in the rotor 13 can thereby be corrected.

In the embodiment shown in FIGS. 1 to 7, the recesses 27 extend all the way through the body 25. However, the side wall of the recesses 27 include a projecting flange, or shelf formation, 43 which prevents the magnets 23 passing all the way through the body 25.

In an alternative embodiment, not shown, it is possible that the recesses may not extend all the way through the body so that the second side of the body, facing the air gap, is fully covered.

A method of assembling a permanent magnet axial flux motor 3 will now be described. Initially, the magnets 23 are inserted into the recesses 27 from the first side of the body 25. Once all of the magnets 23 have been inserted the positioning device 1 will appear as shown in FIG. 3.

The positioning device 1 (including magnets 27) and the rotor disc 13 are then brought together but, before doing so, a ferrous object, such as an annular metal disc 28 (shown in FIG. 3), is brought into contact with the first side of the body. The magnets 23 will thus be attracted to the ferrous object and thereby be held within their respective recesses 27. In this way, the assembly (positioning device 1, magnets 23 and ferrous object) can then be brought into contact with the rotor disc 13 without the magnets 23 immediately being pulled out of the recesses 27 by the rotor disc 13. As the two parts are brought together, the alignment pins 37 will contact the surface of the rotor disc 13. This allows relative movement between the two parts until the pins 37 are aligned with the apertures 39 in the rotor disc 13. Once they are aligned, the pins 37 will engage within the apertures 39 and the connecting clips 35 will permanently attach the magnet positioning device 1 to the rotor disc 13.

Preferably, an adhesive is applied to the magnets 23, or to the rotor disc 13, before the parts a brought together. The magnet positioning device 1, together with the adhesive, would ensure that the magnets 23 do not separate from the rotor disc 13 during operation of the motor 3.

In an embodiment not shown, it is possible that the connecting clips 35 may be omitted. In this way, the magnet positioning device may be removable from the rotor disc once the adhesive has properly cured.

Figure 8:
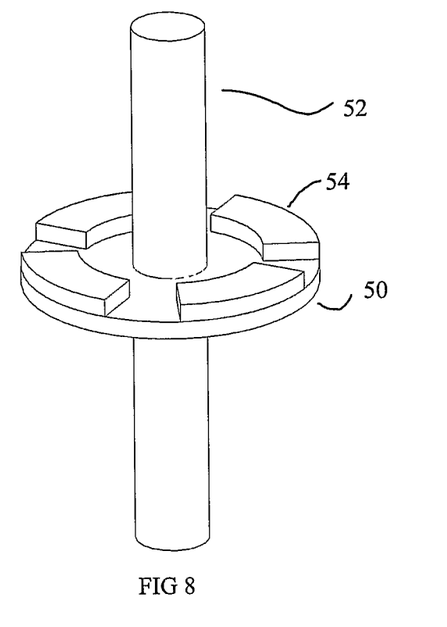
FIG. 8 shows an top perspective view of an alternative rotor for an axial flux motor.
Figure 9:
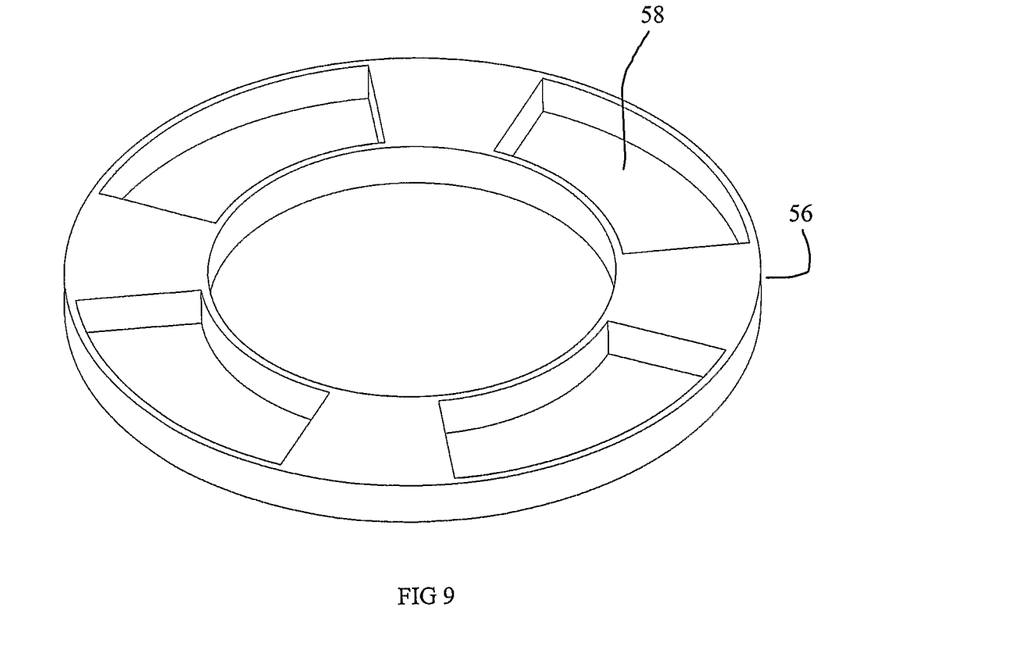
FIG. 9 shows a bottom perspective view of an alternative magnet positioning device for use with the rotor shown in FIG. 8.
Figure 10:
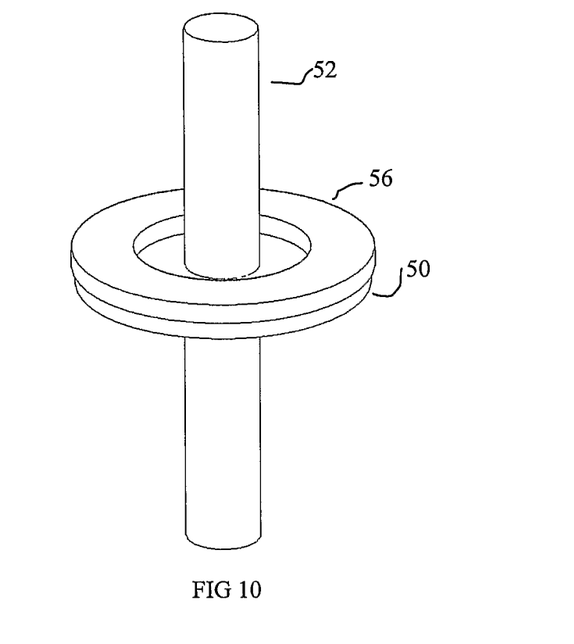
FIG. 10 shows a top perspective view of the rotor of FIG. 8 together with the magnet positioning device of FIG. 9.

Referring now to FIGS. 8 to 10, there is shown a simplified representation of an alternative embodiment of the present invention. FIG. 8 shows a rotor 50 for an axial flux motor attached to a shaft 52. The rotor 50 includes four permanent magnets 54.

FIG. 9 shows a magnet positioning device 56 for use with the rotor 50 shown in FIG. 8. The magnet positioning device 56 includes four recesses which are sized and shaped to conform to the magnets 54 shown in FIG. 8. FIG. 10 shows the magnet positioning device 56 brought together with the rotor 50.

Figure 11:
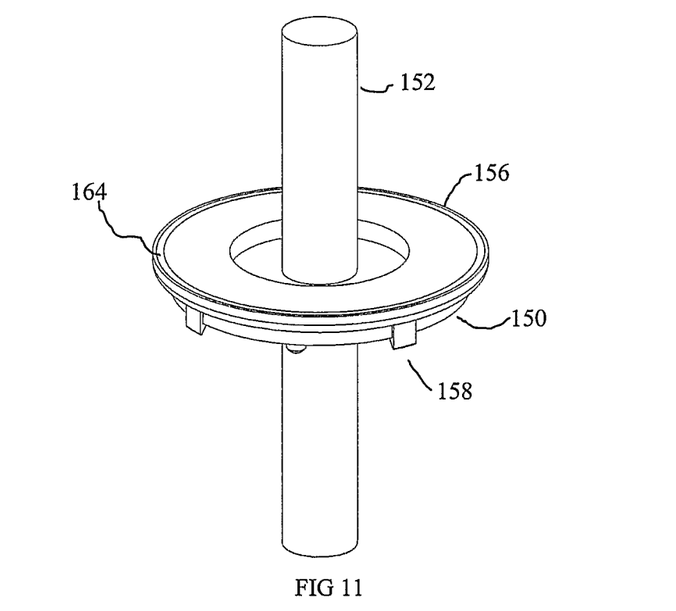
FIG. 11 shows a top perspective view of a further alternative magnet positioning device together with a rotor for an axial flux motor.
Figure 12:
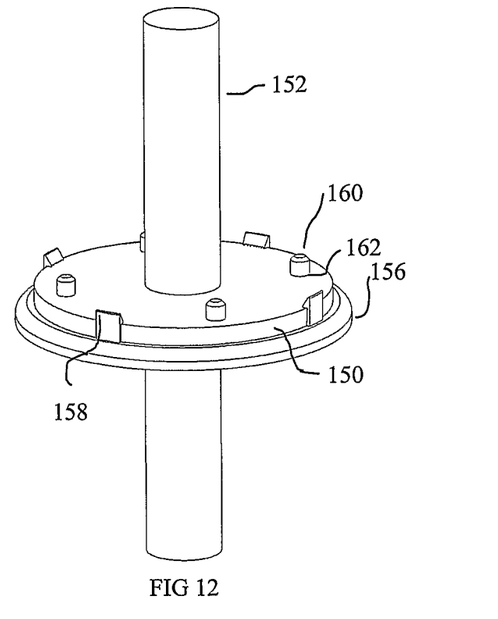
FIG. 12 shows a bottom perspective view of the magnet positioning device and rotor of FIG. 11.
Figures 13, 13A, 13B:
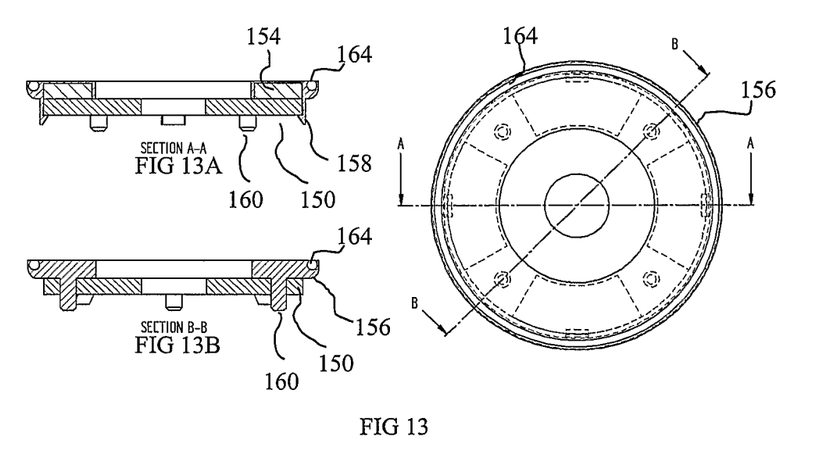
FIG. 13 shows a top view of the magnet positioning device and rotor shown in FIGS. 11 and 12.
FIGS. 13a and 13b show cross sectional side views taken along lines A-A and B-B, respectively, in FIG. 13 (but excluding the shaft which is shown in the previous figures)
Figure 14:
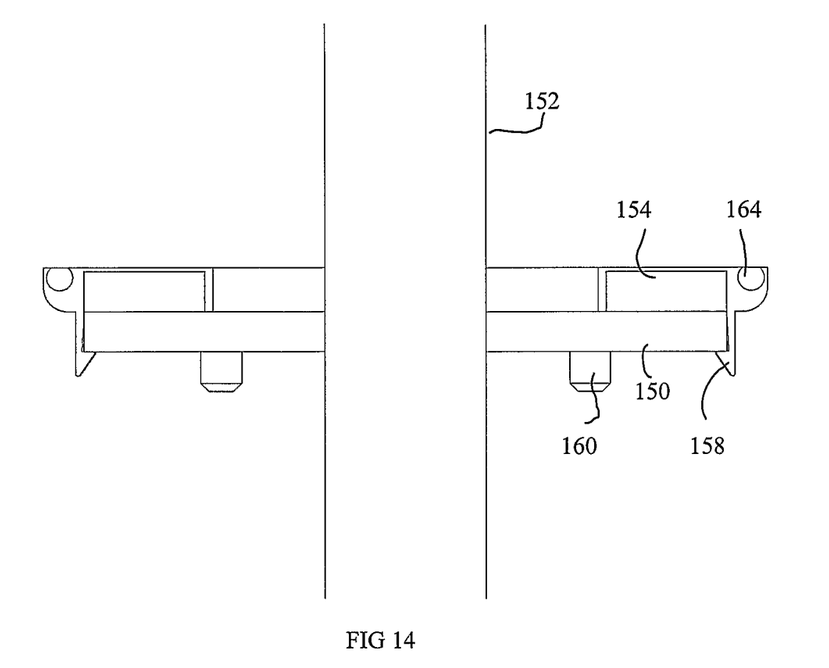
FIG. 14 shows a cross sectional side view of the magnet positioning device and rotor shown in FIG. 11.
Figure 15:
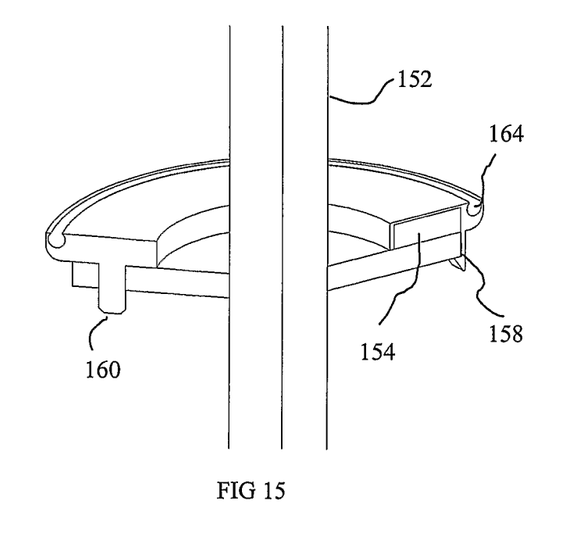
FIG. 15 shows a cut away top perspective view of the magnet positioning device and rotor shown in FIG. 11.

Referring now to FIGS. 11 to 15, there is shown a magnet positioning device 156, in accordance with a further alternative embodiment of the invention, attached to a rotor 150 for an axial flux motor. FIG. 11 shows a top perspective view whereas FIG. 12 shows a bottom perspective view. FIG. 13 shows a top view and FIGS. 13A and 13B show cross-sectional side views taken along lines A-A and B-B, respectively, in FIG. 13. For the sake of clarity, however, the shaft 152, to which the rotor 150 is attached, has been omitted in these Figures. FIG. 14 shows a cross-sectional side view of the rotor and magnet positioning device and FIG. 15 shows a cutaway view of the same combination.

As in the embodiment shown in FIGS. 8 to 10, the rotor 150 is mounted on a shaft 152 and includes four magnets 154. However, in this embodiment the magnet positioning device 156 includes connecting clips 158 spaced around the periphery of the body of the positioning device 156 to attach it to the rotor 150. The magnet positioning device 156 also includes locating pins 160 which engage in corresponding apertures 162 in the rotor 150. The magnet positioning device 156 further includes an annular groove 164 to enable weights to be inserted and retained therein so as to enable any imbalance in the rotor 56 to be corrected.

The method of assembly of the rotors shown in FIGS. 8 to 10 and 11 to 15 is the same as the method involved in the assembly of the embodiment shown in FIGS. 1 to 7.

Figure 16:
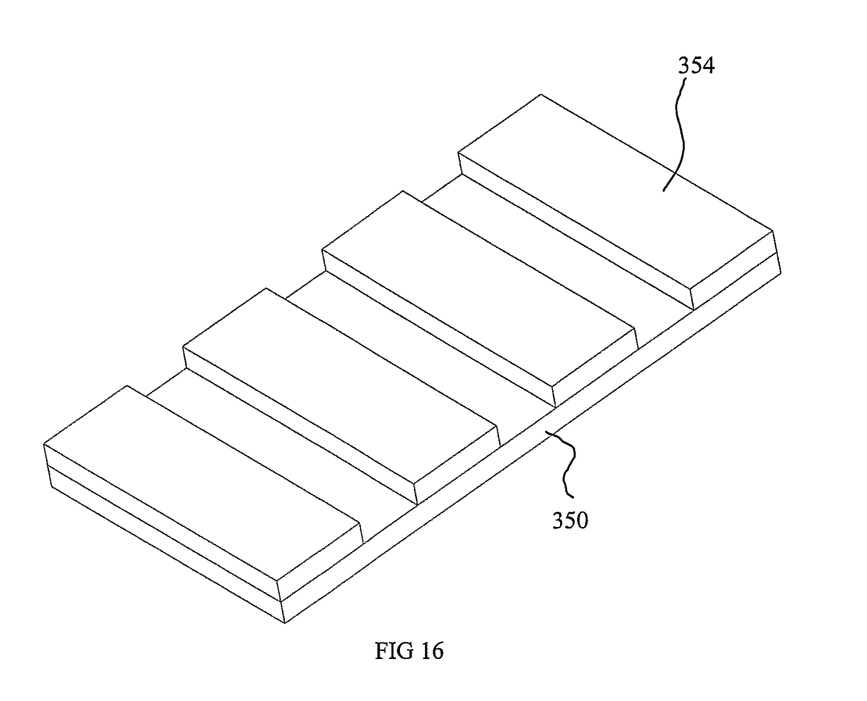
FIG. 16 shows a perspective view of a rotor for a linear motor.

Referring now to FIGS. 16 to 19, there is shown a further embodiment of the present invention as applicable to a linear motor. FIG. 16 shows a rotor for the linear motor. In this type of motor, the term "rotor" should be interpreted broadly to mean the moving part of the motor. Clearly, the rotor does not rotate in this instance but, instead, travels linearly with respect to a stator of the linear motor. The rotor 350 includes permanent magnets 354.

Figure 17:
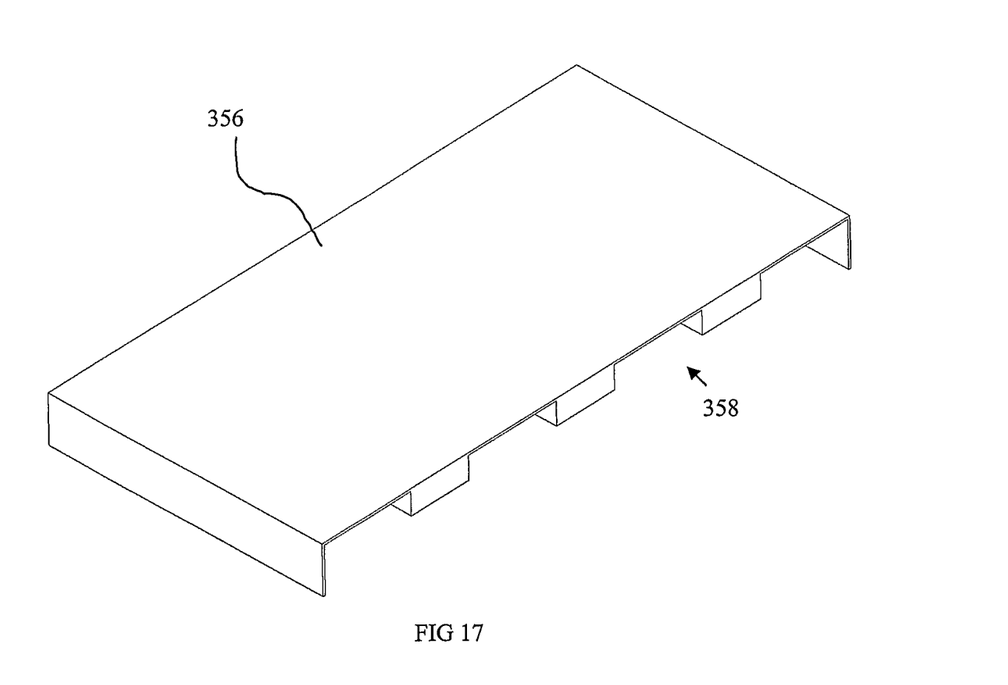
FIG. 17 shows a top perspective view of a magnet positioning device for the linear rotor shown in FIG. 16.
Figure 18:
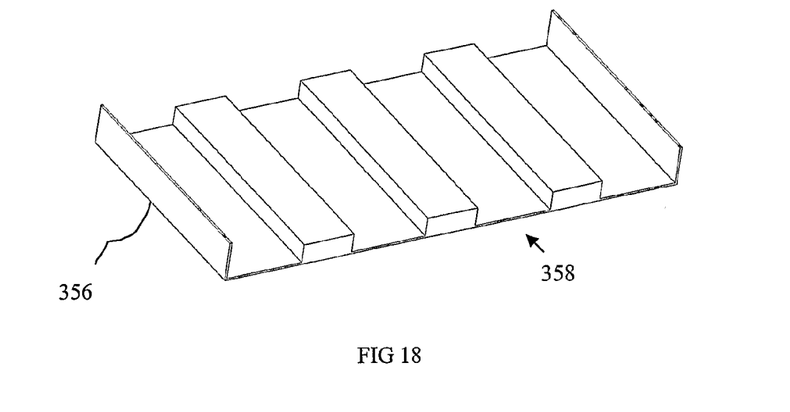
FIG. 18 shows a bottom perspective view of the magnet positioning device of FIG. 17.
Figure 19:
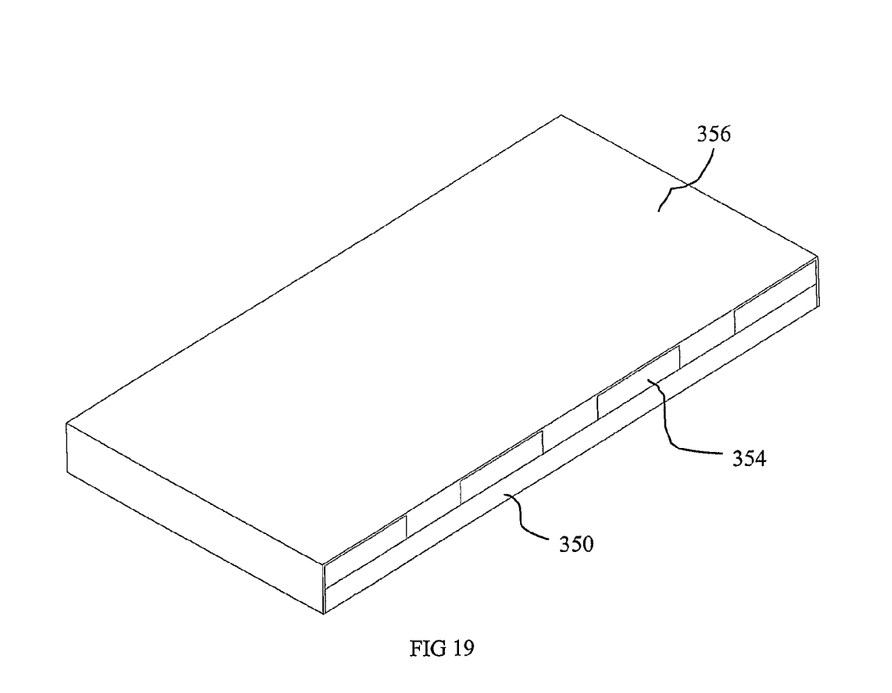
FIG. 19 shows a top perspective view of the linear rotor shown in FIG. 16 together with the magnet positioning device shown in FIGS. 17 and 18.

FIGS. 17 and 18 show top and bottom perspective views, respectively, of a magnet positioning device 356 in accordance with an embodiment of the present invention. The magnet positioning device 356 includes recesses 358 therein for receiving corresponding magnets 354 as shown in FIG. 19.

Although preferred embodiments of the invention have been described herein in detail, it will be understood by those skilled in the art that variations may be made thereto without departing from the spirit of the invention or the scope of the appended claims. For example, the connecting means could include clips, as shown in the embodiments described herein, but could alternatively be formed by thermal deformation, ultrasonic welding or some other form of connection between the magnet positioning device and the rotor. Similarly, the locating means may be in the form of projecting pins, as shown in the embodiments described herein, but could alternatively be corresponding formations within the magnet positioning device and rotor. Such alternatives are considered to be clearly within the scope of the appended claims.

The invention claimed is:

1. A device for positioning a planar array of magnets within a permanent magnet electrical machine, the machine including a rotor and a stator with an air gap there between, the device including a body made of non-magnetic and non-electrically conductive material and having a first side which is attachable to the rotor and a second side which, in an assembled machine, faces the air gap, the first side of the body having an inner support ring, an outer support ring, and a plurality of recesses therein for receiving a corresponding plurality of magnets, the recesses being shaped and arranged to separate the magnets from each other and maintain a consistent spacing between them, such that when the device is attached to the rotor the magnets are held in a fixed position against the rotor, the device further including at least one connector extending from the outer support ring for attaching the body to the rotor.

2. A device as defined in claim 1 further including an annular ring for enabling weights to be secured to the device and thereby allow any imbalance in the rotor to be corrected.

3. A device as defined in claim 2 wherein the annular ring is located around a peripheral edge of the body, the cross sectional shape of the annular ring being configured to enable weights to be inserted and retained therein.

4. A device as defined in claim 1 wherein the electrical machine is an axial flux rotary motor having a disc shaped rotor which is rotatable about an axis, the disc shaped rotor spaced from the stator in a direction extending along the axis to define the air gap there between, the body of the device having an annular shape with the plurality of recesses spaced about the annulus such that the plurality of magnets are spaced around the axis.

5. A device as defined in claim 1 wherein the at least one connector includes a plurality of clips spaced around the body outer support ring to attach the body to the rotor.

6. A device as defined in claim 5 wherein the plurality of clips are positioned adjacent a peripheral edge of the body and are shaped to engage a peripheral edge of the rotor.

7. A device for positioning a planar array of magnets within a permanent magnet electrical machine, the machine including a rotor and a stator with an air gap there between, the device including a body made of non-magnetic and non-electrically conductive material and having a first side which is attachable to the rotor and a second side which, in an assembled machine, faces the air gap, the first side of the body having an inner support ring, an outer support ring, and a plurality of recesses therein for receiving a corresponding plurality of magnets, the recesses being shaped and arranged to separate the magnets from each other and maintain a consistent spacing between them, such that when the device is attached to the rotor the magnets are held in a fixed position against the rotor, the device further including at least one pin extending from the inner support ring for aligning the body relative to the rotor.

8. A device as defined in claim 7 wherein the at least one pin projects in an axial direction from the first side of the body for engaging with a corresponding aperture in the rotor to thereby facilitate alignment of the body of the device with the rotor.

9. A device as defined in claim 8 wherein the at least one pin includes at least three pins projecting in the axial direction from the first side of the body for engaging with at least three corresponding apertures in the rotor, the pins being configured to hold the first side of the body away from the rotor until the at least three pins and corresponding apertures are aligned.

10. A method of assembling a rotor for a permanent magnet electrical machine, the method comprising:

providing a rotor having at least one aperture;

providing a magnet positioning device that includes a body having a first side and a second side, the first side comprising an inner support ring, an outer support ring, and a plurality of recesses;

providing a plurality of clips extending axially from the outer support ring to attach the body to the rotor;

providing at least one pin extending axially from the inner support ring for engaging with the at least one aperture of the rotor to facilitate alignment of the body of the device with the rotor;

providing a plurality of magnets, the plurality of magnets configured to be positioned at least partially within the plurality of recesses;

inserting the plurality of magnets into the recesses in the first side of the body of the magnet positioning device;

bringing a ferrous object into contact with the second side of the body of the magnet positioning device such that the ferrous object is adhered to the magnet positioning device by magnetic forces generated by the plurality of magnets and the plurality of magnets are held within the recesses by the magnetic forces;

attaching the first side of the body of the device to the rotor such that the magnets are held in a fixed position against the rotor; and removing the ferrous object from the second side of the body.

11. A method in accordance with claim 10, further comprising applying an adhesive to at least one of the plurality of magnets and the rotor.

12. A method in accordance with claim 10, further comprising inserting weights at least partially within an annular ring included within the body to balance the rotor.

13. A permanent magnet electrical machine comprising:

a stator;

a rotor including a plurality of apertures, said rotor configured to rotate with respect to said stator, wherein said rotor and said stator are separated by an air gap there between;

a plurality of magnets; and a magnet positioning device comprising a body having a first side which is configured to be coupled to said rotor, and a second side which, in an assembled machine, faces the air gap, said first side of said body comprising:

an inner support ring;

an outer support ring;

a plurality of clips axially extending from said outer support ring for attaching said body to said rotor;

a plurality of pins axially extending from said inner support ring for engaging with said plurality of rotor apertures to align said magnet positioning device and said rotor; and a plurality of recesses therein for receiving said plurality of magnets, said plurality of recesses configured to separate each magnet of said plurality of magnets from other magnets of the plurality of magnets, said magnet positioning device configured to secure said plurality of magnets in a fixed position against said rotor.

* * * * *